3,067,593
INTEGRAL TOOL JOINT DRILL PIPE
Marcus Gresham McCool, Oklahoma City, Okla., assignor to American Iron & Machine Works Company, Inc., Oklahoma City, Okla., a corporation of Delaware
Filed Aug. 29, 1960, Ser. No. 52,398
17 Claims. (Cl. 64—1)

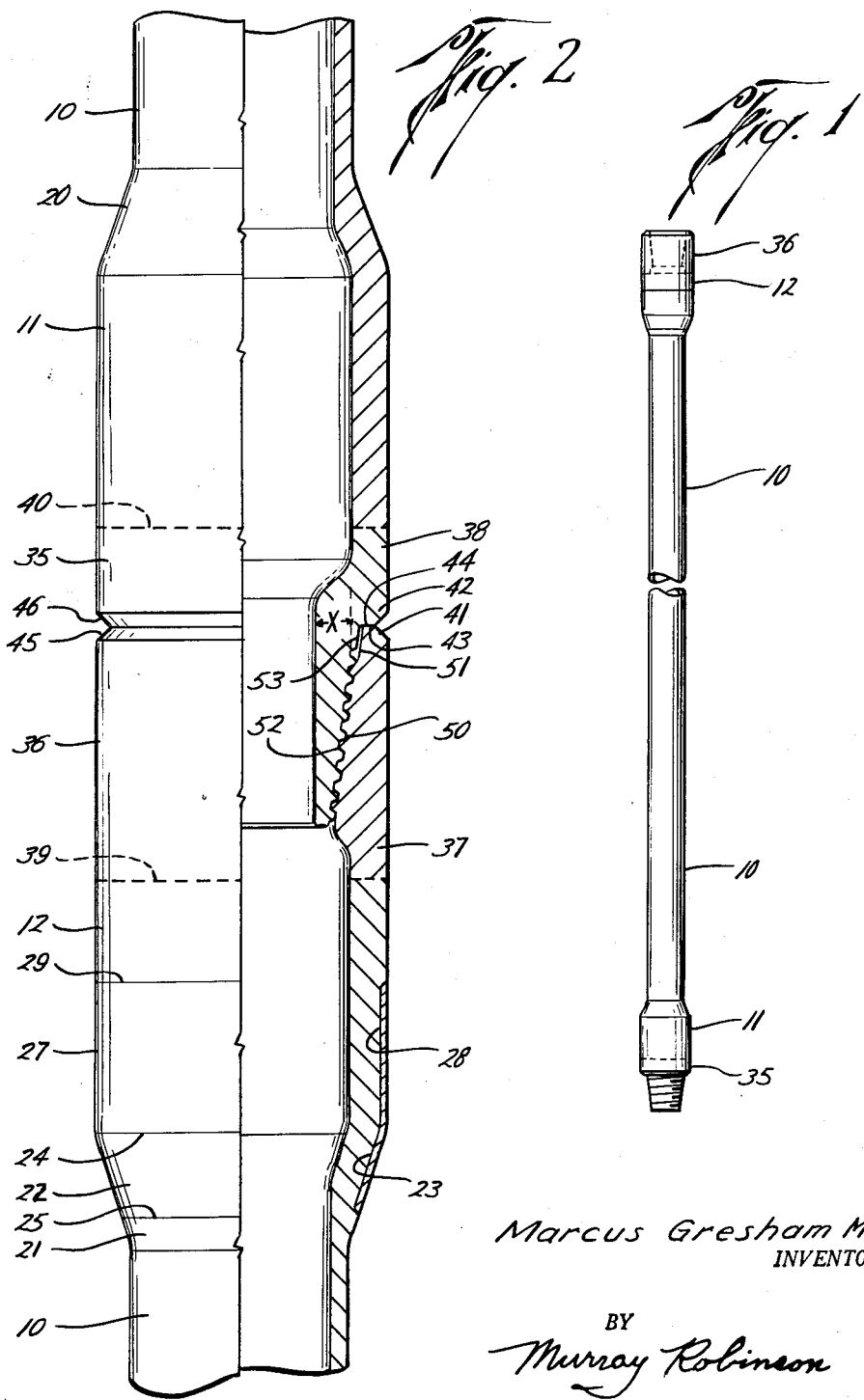
Dec. 11, 1962   M. G. McCOOL   3,067,593
INTEGRAL TOOL JOINT DRILL PIPE
Filed Aug. 29, 1960
Marcus Gresham McCool
INVENTOR.
BY
Murray Robinson
ATTORNEY

United States Patent Office 3,067,593
Patented Dec. 11, 1962

This invention pertains to drill strings used in the rotary method of drilling oil wells, and more particularly to the lengths of drill pipe and the tool joint connections therebetween.

1. Tool Joint vs. Line Pipe Couplings

Tool joints are threaded tapered pin and box connections located between the ends of drill pipes. Tool joints are distinguished from usual line pipe connections by the provision of radial faces or shoulders on the pin and box which abut to limit the degree of makeup of the connection and prevent bursting of the box under the torsional loads of drilling. These abutting surfaces also provide a better seal. The abutting surfaces are spaced axially from the threads such a distance that the unthreaded portions of the pin and box therebetween are, when the joint is fully made up, placed respectively in compression and tension, putting axial stress on the threads to prevent accidental unscrewing of the connection, and on the seal to maintain the seal when the joint is placed in tension. The tool joints are bevelled on their outer peripheries adjacent the abutting surfaces to further increase the stress at the seal areas. The unthreaded portions of the tool joints adjacent the abutting surfaces, e.g. the bevelled portions may be called the abutment portions. The further unthreaded portions of the tool joints between the abutment portions and the threaded portions may be called the spacer portions.

Tool joints are constructed to withstand the repeated makeup and breakout incident to the connection and disconnection of the drill pipe lengths going into and coming out of the hole. They are thus further distinguished from line pipe threaded pin ends and line pipe couplings by the ruggedness of their threads, as is required to resist damage during stabbing of the pin into the box, to resist wear during repeated screwing together and unscrewing of the connection under high torsional and radial compressive loads, and to withstand the axial loading due to the weight of the drill string suspended therefrom or supported thereabove and the various bending, torsional, and other stresses incident to drilling.

The ruggedness of the tool joint threads is achieved not only by using threads of large cross-section but by using stronger steel than the usual line pipe connections.

2. Tool Joint Life vs. Drill Pipe Life

Drill pipe is similarly distinguished from usual line pipe by the better quality of the material needed to withstand the added loads and wear incident to drilling. If the drill pipe is made of steel that is of sufficient hardenability and toughness, the tool joint pin and box can be formed directly on the ends of the pipe, but since experience shows that tool joints usually wear out before the pipe it is usual to make the tool joints of a different, better material, and attach them by some means to the ends of the pipe. In the past, even with the tool joints of better material than the drill pipe, they still wore out faster than the pipe and were connected to the pipe by quick attachable and detachable means, e.g. screw threaded connections, which were themselves the source of considerable trouble.

With the use of a better material for the tool joint than that of the pipe, the thread life of the tool joints can be increased to the point where the joint thread life more nearly approaches the life of the drill pipe. However there are other points of wear on the tool joint.

3. Thread Life vs. Wall Life

Tool joints preferably have a larger outer diameter than the drill pipe in order to provide shoulders to be gripped by the elevators. With the tool joint box at the upper end of the drill pipe as is usual, it is the box shoulder that faces downwardly to be gripped by the elevators in handling the pipe. The elevator shoulders are themselves subject to wear, not only by contact with the elevators but primarily by the abrasion of the cuttings in the mud flowing upwardly therepast. In addition, since the tool joints are of larger diameter than the drill pipe, the tool joints to a large degree prevent the drill pipe from contacting the sides of the well, acting similarly to centralizers or stabilizers, so that most of the wear of rubbing of the drill string against the well wall is taken by the tool joints rather than the drill pipe. Finally, the outer surface of the tool joints must be engaged by pipe tongs to makeup and breakout the connection between the tool joints. These tongs have hard sharp teeth which indent the tool joints in order to grip them and thus cause additional wear and weakening of the tool joints.

With plain alloy steel tool joints, the threads usually last longer than the outer diameters of the boxes. When the outer diameter of the tool joint box becomes reduced to the point where the box wall is too thin to adequately hold the pin, the joint has to be replaced. Since the box wall is thus the point first to wear out, it is made of as great a thickness as is possible, the limiting factors being that the inner diameter of the joint must be large enough to prevent undue pressure drops in the mud flowing through the joint and the outer diameter must be small enough to leave room for the cuttings laden mud to flow through the annulus between pipe and well wall and to reduce the likelihood of the joint getting stuck in tight places, bends, and key seats in the well.

4. Balanced Life Tool Joints

In order further to reduce the rate of water of tool joints so as to bring their life more nearly into balance with that of drill pipe, it would be desirable to use harder material. However there are limitations on the hardness that can be used because the joints must be soft enough to be gripped by the pipe tongs and the joints must have considerable toughness, i.e. impact strength. Therefore to provide superior performance for the tool joints, especially the box which is subjected to wear at the elevator shoulder and wear by external rubbing against the well wall, the joints may be provided with annular bands of hard facing materials sufficient to protect the joints from wear but leaving sufficient areas of bare tool joint metal to be gripped by the tongs.

With tool joints made of fairly hard, strong material, and coarse threads, thick walls, and hard bands, the tool joint life approaches that of the drill pipe so that it is unnecessary to frequently replace the tool joints and they can be more nearly permanently connected thereto, e.g. by integral welding. Extending from the thick walled body of the tool joint there is provided a thinner neck which is integrally welded to an upset end portion formed on the pipe by upsetting. The weld area is thicker than the pipe to insure weld strength at least equal to the pipe, but is thinner than the main body of the tool joint in order to make possible a satisfactory weld. The elevator shoulder, usually an 18 degree externally tapered portion, is usually provided at or near the transition piece formed by the joint neck and pipe upset. Such tool joint drill pipe connections made by flash welding are in common use.

5. *Difficulties with Tool Joints*

It will be appreciated that tool joints of the last above mentioned type are both expensive and heavy due to the thick walled alloy steel forging used for the joint. Another difficulty with such connections lies in the fact that the weld area is closely adjacent the elevator shoulder which is subject to excessive wear. A further basic weakness in this construction lies in the excessive stresses imposed at the weld area due to the rapidly changing thickness and the lack of perfect alignment between the axes of the tool joint and pipe end.

With the vastly improved wear characteristics imparted to the outer periphery of tool joints by the use of hard facing, the thread has again become the weakest part of the tool joint and a further disadvantage of the current integral welded hard faced tool joints lies in the fact that if the thread is damaged and needs to be replaced, the whole tool joint including the hard bands needs to be cut off and discarded.

Further improvements in the life characteristics of the tool joint thread by the use of harder, tougher and stronger alloy steels are hampered by the increasing cost of the heavy thick walled forging required for the joint. This is especially true in the case of the high tensile strength drill pipe required for deep wells. For greatest strength an alloy steel drill pipe is required instead of the usual carbon steel drill pipe. To match the tool joint thread strength and life to those of the alloy steel pipe, the tool joint must be made of an even more expensive superior alloy steel.

6. *The Invention*

According to the invention an improved tool joint-drill pipe construction is provided overcoming the above mentioned difficulties and providing superior performance at low cost. The invention contemplates tool joints wherein substantially only the mating, i.e. the threaded, spacer and abutting portions are made separately from the pipe. These mating portions or rings are integrally welded to the drill pipe, a tong portion for the pin and a hard faced portion for the box being formed on the pipe by suitable operations on the ends thereof. The pipe ends, that is, the tong portion of the pin and the hard faced portion of the box are made with an outer diameter equal to the maximum outer diameter of the separately made threaded portions, the same being the maximum outer diameter of the tool joints. The inner diameter of the pipe ends is larger than the inner diameter of the long central or body portion of the pipe. The pipe ends are thus bells. The inner diameter of the separately made mating portions or rings of the tool joints is larger at the neck ends where welded to the pipe bells than at the threaded portions of the rings and is equal to that of the pipe bells so that the thickness of the pipe bells and the welding necks on the rings is equal at the area of welding.

The pipe bell connected to the box ring is hard faced at its outer periphery, and the elevator shoulder provided at the transition piece between the pipe body and box bell is also hard faced, thus insuring tool joint life equal to that of the drill pipe body. The hard facing can be applied in any of a number of ways, e.g. by welding it into a groove formed in the pipe end, or by spraying it on. The hard facing should be either flush with the steel or else fine grained in order to avoid excessive wear on the elevators. Alternatively if the pipe is made of sufficiently hardenable material, e.g. alloy steel, the pipe end can be flame hardened or induction heat treated. Case hardening, while conceivable, would be more difficult due to the larger size of the pieces to be heated. By whatever means preferred, the pipe bell welded to the box ring is provided with a hard wear surface sufficient to protect the entire connection for the life of the drill pipe.

The pipe bell welded to the pin ring may be normalized to the same state as the body of the drill pipe or, if the pipe is made of sufficiently hardenable material, may be flame or induction or in other manner heat treated to produce a hardness more nearly equal to that of the pin ring so as to provide a tong area of hardness equal to that of the tong area provided by the outer periphery of the box ring thereby making tong procedures more uniform. Hardening of the tong area provided by the pin bell, i.e. the bell at the pin end of the pipe, will also make its wear resisting properties approximate that of the alloy steel ring portions of the joints. Preferably any heat treatment of the tong section provided by the pin bell will be a surface treatment so as to preserve continuity of hardness between the body of the pipe and the core of the pin bell, the same as at the box bell. Any hardening of the pin bell must still leave it soft enough to be tong engaged. Therefore the desired heat treatment surface hardening can be achieved with steel of much less hardenability than that required to produce on the box bell a satisfactory wear resistant surface. The upwardly facing transition piece between the pin bell and body of the pipe need not be hardened since it is not as subject to wear as the downwardly facing transition piece at the elevator shoulder on the box bell.

For a further description of a preferred embodiment of the invention reference will now be made to the accompanying drawings wherein:

FIGURE 1 is an elevation of a length of drill pipe provided with tool joint pin and box ends all made in accordance with the present invention;

FIGURE 2 is an elevation, partly in section, to a larger scale than FIGURE 1, showing the tool joint pin and box connection between two drill pipes of the kind shown in FIGURE 1.

Referring now to FIGURE 1 there is shown a drill pipe including a seamless tubular body 10 having a uniform wall thickness, inner and outer diameter. The drill pipe body is made by heating a short tubular forging to a plastic temperature and extruding it through appropriate dies. The pipe is preferably made of machinery grade carbon steel, these terms being used as in Mark's Mechanical Engineer's Handbook, sixth edition, published 1958 by McGraw Hill Book Company, Inc., from which it appears on pages 6–29 that machinery grade carbon steel may be defined as steel having a carbon content in the range of 0.30% to 0.55%, and on pages 6–32 to 6–35 that carbon steel may be defined as steel similar to that of the AISI 1000 to 1200 range, to be distinguished from the alloy steels of the 1300–9900 range. The drill pipe may for example be made to meet the specification for grade D or preferably grade E drill pipe set up by API Standard 5A, 23rd edition, March 1960.

Especially in the case of exceptionally high tensile drill strings, the drill pipe may also be made of alloy steel. For example the drill pipe can be made of a steel such as an AISI thirteen hundred series steel or of a manganese or manganese vanadium steel known as J. and L. Blue Ribbon and Blue Ribbon Vanadium drill pipe. The drill pipe will however usualy have a lesser harden-ability and/or toughness when hardened than the steel used for the thread rings.

After the pipe body has been extruded, thickened bells 11, 12 are formed on the ends thereof, preferably by a combination of upsetting and expansion while the ends of the pipe body are at a plastic temperature. However other methods may be used to form the bells including cold working. Thereafter the whole unit comprising body and bells is normalized throughout, producing a Brinell hardness of the order of 200, i.e. in the range of 160 to 240 characteristic of hypoeuctectoid pearlitic steel.

As best shown in FIGURE 2, bell 11 at the lower end of the drill pipe body is a generally cylindrical tubular portion of uniform wall thickness and inner and outer diameter. Between bell 11 and body 10 is a transition piece 20 flaring and of increasing wall thickness progressing away from body 10 toward bell. The small diameter part of the transition piece has a wall thickness and inner and outer diameter equal to that of the body 10, and the large diameter part of the transition piece has a wall thickness and inner and outer diameter equal to that of the bell. The externally exposed outer peripheral surface of the bell is long enough to accommodate pipe tongs. The gripping teeth or dies of the usual pipe tongs will have a hardness of the order of 550–700 Brinell, the cementite-martensite range and in order for the bell surface to be tong-engageable it needs to have a somewhat lesser hardness. The bell 11 may therefore be left in the normalized condition or as mentioned in the introduction can be hardened, preferably only at the surface, in order to improve its wear resisting characteristics, but the maximum hardness to be tong-engageable will be kept below 550 Brinell.

FIGURE 2 also shows the upper end of a drill pipe and although this obviously must be a different length of pipe from the pipe whose lower end is shown in FIGURE 2, the pipes will be alike and therefore will be given the same reference numbers.

The bell 12 and transition piece 21 at the upper end of body 10 are the same as the bell 11 and transition piece 20 except as follows. The transition piece 21 provides an external downwardly facing 18 degree taper shoulder for engagement by the elevators. If desired the transition piece can instead be provided with a 90 degree shoulder or other shape as desired to engage with other forms of elevators. The transition piece 20 on the other hand, is not normally engaged by the elevators and may have any external shape as may be desired.

The downwardly facing outer surface of transition piece 21 is subject to the abrasion of the cuttings in the upwardly flowing mud and hence is provided with a hardened surface at 22. As shown, surface 22 is provided by forming an annular recess 23 around the upper part of the transition piece and filling it with tungsten carbide hard facing material suitably held in place. The recess 23 extends axially all the way to the juncture 24 with bell 12 but in the opposite direction terminates at 25 short of the body 10 in order to provide sufficient wall thickness at the juncture of the transition piece and body.

The outer peripheral surface of bell 12 is hard surfaced at 27 to provide protection for the whole tool joint with respect, primarily, to rubbing against the well wall during the rotation of the drill pipe in drilling and may therefore be called a rotational wear resisting surface. As shown the surface 27 is provided by forming an annular recess 28 around the lower part of the bell and filling it by welding with tungsten carbide hard facing material. The recess 28 extends axially all the way to juncture 24 with transition piece 21 but in the opposite direction terminates at 29 in order to provide full wall thickness at the upper end of the bell where it is to be welded to a boxring.

The hard surfaces 22, 27 are contiguous and thus supported axially by each other as well as by the shoulders at the upper and lower ends 29, 25 of the recesses 28, 23. If desired other carbides than tungsten carbide can be used for hard surfaces 22, 27, alone or in combination. For example titanium carbide can be admixed with the tungsten carbide. Such other carbides are not as hard as tungsten carbide but are tougher. However the surfaces 22, 27 should at least have a hardness above about 550 Brinell, 78 Rockwell A, the hardness of iron carbide or cementite. These hard surfaces could also be formed by any of the other methods referred to in the introduction, and if the body 10 were made of alloy steel, flame hardening of the surfaces 22, 27 could produce a hardness of around 700 Brinell or 83 Rockwell A, that of martensite. While this is still considerably softer than the around 88–93 Rockwell A hardness of the tungsten carbide surfaces shown, it is sufficient when drilling in less abrasive formations to balance the long life of the alloy steel drill pipe. Speaking generally the surfaces 22, 27 may be said to have a carbide hardness, i.e. in the range 78–93 Rockwell A, iron carbide to tungsten carbide.

Referring again to FIGURE 1, to the ends of bells 11 and 12 are integrally welded alloy steel pin and box rings 35 and 36. The integral welding may be performed by any desired integral welding process such as flash welding or pressure welding. As best shown in FIGURE 2, each of these rings has a generally cylindrical outer peripheral surface of a diameter equal to that of the bells 11, 12. Each ring is provided with a neck, as shown at 37, 38 of a wall thickness and inner and outer diameter equal to that of the bell and integrally welded to the adjacent bell, the weld lines being indicated by dashed lines 39, 40.

Each ring is provided with an annular abutment portion at the end of its full outer diameter portion opposite from the weld neck, the abutment portion 41 of the box ring 36 being at the mouth of the box and the abutment portion 42 of the pin ring being at the root of the pin. Each abutment portion includes a radially extending abutment face as shown at 43, 44 and may be provided with a beveled surface as shown at 45, 46 whereby burrs raised by hitting the drill pipe on its end will in most cases be kept away from the abutting surfaces 43, 44, and the makeup stress at these surfaces will be increased to form a better seal.

Each ring is provided with a tapered threaded portion and a spacer between the threaded portion and the abutment portion. Thus, box ring 36 is provided with a tapered inner periphery including a threaded portion 50 and a spacer portion 51. Pin ring 35 is provided with a tapered outer periphery including a threaded portion 52 and a spacer portion 53. The lengths of the unthreaded spacer and abutment portions are related to the diameters of the threaded portions so that when the box is made up on the pin with the box unthreaded portion in compression and the pin unthreaded portion and unengaged threaded portion in tension sufficient to form a seal at the abutting surfaces 43, 44 even when the maximum expected tension is placed on the connection, the box will be radially expanded and in circumferential tension while the pin will be radially contracted and in circumferential compression.

Axial tension on the drill string and the tool joint connection between the lengths of drill pipes included therein will add to the tension in the spacer portion 53 of the pin and lessen the compression in the spacer portion 51 of the box. Since axial loads on a threaded connection are concentrated at the last turns at each end of the threads, the maximum load thus occurs on the pin thread at the last turns thereof adjacent spacer portion 53. It is found that most tool joint failures occur here at the last scratch of the pin thread. The ring section here is of a thickness marked X on the drawing. This section is made thick enough to avoid failures under the expected loads to be imposed on the drill string in which the connection is to be used. In order that the box not be overstressed during makeup, and in order to achieve the empirically determined desirable 2.5 ratio of the polar section modulus of the box adjacent the small end of the pin to the polar section modulus of the pin at section X with usual tapers (1.5 to 3 inches per foot) and usual lengths of threaded portions (2 to 4.5 inches), the box is made of about equal thickness to the pin thickness at section X. It is to preserve the box wall thickness that the hard surfacing 23, 27 of the adjacent bell 12 is provided. In order that the welds at 39, 40 may be as strong and stiff as the pin section at X, they are made with a wall thickness roughly (±15%) equal to the wall thickness at X. The welds are thus able to take the full axial loads imposed by the weight of the drill string, and despite such misalignment of the bell and ring axis as is inherent in the separate manufacture thereof, the welds are able to take the bending stresses imposed thereon by the weight of the drill string.

It is to be noted that due to the welds being made at the full tool joint diameter, they are of greater area in cross section perpendicular to the pipe axis than are welds of equal wall thickness made at portions of less diameter. The greater area of the weld reduces the unit stresses on the weld area compared to welds of equal thickness in the elevator shoulder area. The increased inner and outer diameters of the weld area of joints made in accordance with the invention increases the moment of inertia of the cross-section at the weld, thereby increasing the stiffness and reducing the stress concentrations in the outer fibres when bending moments are applied thereto, e.g. by pipe weight when ring and bell areas are slightly angularly misaligned. Finally, the placement of the weld between the bell and thread ring in accordance with the invention removes the concentrated elevator loads from the weld area and places it on a part that is made of the same piece as the pipe body. This also makes it possible to design the shape of the elevator shoulder independently of the design of the weld area.

It is also to be observed that with tool joints constructed in accordance with the invention the inventory of parts that need be carried by the tool joint ring manufacturer will be reduced, thereby resulting in a further cost reduction to the user. Tool joints are customarily made with various proportions thereof protruding inwardly and outwardly from the drill pipe inner and outer surfaces. For example with internal flush joints, no parts protrudes inwardly, while with old style regular API joints a considerable portion protruded inwardly and much less outwardly. Between these extremes are various Full Hole and Xtra Hole designs. These various tool joint styles may be placed on internal upset, external upset, or combined internal-external upset pipe. The selection of any particular combination of pipe upset and tool joint depends on the well depths, mud pressures required, and formation abrasiveness. With joints made according to the invention all pipe will be external upset, varying in diameter according to the tool joint outer diameter, and all tool joint rings of the same outer diameter can be welded thereto regardless of their internal diameter, the internal minimum diameter at the pin thread being independent of the inner diameter of the weld neck.

A further feature of tool joints made according to the invention is the absence of any bottom portion on the box, that is, any portion having an inner diameter equal to the inner diameter of the pin and providing a shoulder on the box close to the end of the pin. Instead the box ring maximum inner diameter is no smaller than the crest diameter of the smallest diameter part of the thread, and progressing from the last thread scratch at the small diameter end thereof toward the weld neck the box inner diameter rapidly increases until it is equal to that of the pipe bell. This effects a considerable saving in weight.

The pin and box rings 35, 36 may be forgings made of alloy steel such as ASTM 4140 heated to 1550 degrees F. in a furnace and quenched in an oil bath at a temperature of 100–220 degrees F. producing a hardness of 500 Brinell, and then drawn in a furnace of 1060 to 1150 degrees F. to produce a final hardness of 302–331 Brinell. While this produces a material hard enough to have an adequate thread life, it is still within the tong engageable limit of 550 Brinell referred to previously and the exteriorly exposed outer peripheral surface of the threaded part of the box ring is long enough to accommodate tongs.

It will be apparent from the foregoing description of the properties of the alloy steel thread rings that it is desirable to make them separately from the drill pipe even if the pipe is made of hardenable alloy steel, for the rings are to be given an entirely different heat treatment from the pipe. Also, the rings will be made of a different more expensive alloy steel from any that will be used in the pipe. Finally, the maximum wall thickness of the ring forgings is much greater than that of the pipe bells.

In manufacturing, the ring forgings are completely machined except for the abutting faces, whose locations determine the seal stresses, prior to heat treatment. The abutting faces, and if desired, the threads, are machined after heat treatment. The rings are then welded to the bells and the weld areas normalized and stress relieved. The weld areas are then machined smooth both internally and externally. At this time the box bell recesses 23, 28 may be machined and the tungsten carbide applied, or either or preferably both of these steps may be performed prior to welding on the rings.

From the foregoing description of the drill pipe and its tool joint ends made in accordance with the invention, it will be apparent that the invention provides tool joints of lower cost due to the elimination of about half of the usual amount of alloy steel used, and of lighter weight due to the reduction in wall thickness at the tong area of the pin and the hard surfaced area of the box, and greater reliability due to the better location of the weld. Although these savings may only amount to a few dollars and several pounds per connection, with several hundred such connections in a drill string the saving is important. And the elimination of misalignment type weld failures, even though such failures are infrequent, is in itself a great achievement due to the great expense of fishing jobs and the possibility of even completely losing a well in case of a drill string failure.

Summarizing, the invention contemplates belling the ends of drill pipe to full tool joint outer diameter and integrally welding alloy steel thread rings thereto, the pin end bell providing a tong surface comparable to the tong surface provided by the box ring, the bells having a thickness equal to the root thickness of the pin wall, and the box end bell providing a hard surfaced area to protect the whole joint. There is thus provided at each end of the drill pipe a tool joint member which is a composite including a bell on the end of the drill pipe and a separately made thread ring.

While a preferred embodiment of the invention and certain modifications thereof have been shown and described, many modifications thereof can be made by one skilled in the art and it is intended to protect by Letters Patent all forms of the invention falling within the scope of the following claims.

What I claim is:

1. A tool joint box comprising a pipe end upset of carbon steel integrally welded to an alloy steel threaded box ring of maximum outer diameter equal to that of the pipe end upset, said pipe end upset including at one end a bell of uniform diameter equal to said maximum outer diameter disposed adjacent said ring and at the opposite end a transition piece tapering down from said maximum outer diameter adjacent the bell, said pipe end upset being hard surfaced at the juncture of said bell and transition piece and annular areas adjacent thereto, the hard surfaced area on said bell terminating short of the welded end of the bell by a distance less than the axial length of the threaded portion of the box ring.

2. A tool joint pin comprising a pipe end bell of carbon steel integrally welded to an alloy steel threaded pin ring having a maximum outer diameter equal to that of the pipe end bell, the pipe end bell having an externally exposed outer peripheral maximum outer diameter tong engageable surface of a length at least equal to the length of the threaded portion of the ring and said bell having a uniform wall thickness roughly ($\pm 15\%$) equal to the wall thickness of the pin root at the last thread scratch.

3. A tool joint box comprising a pipe end upset of carbon steel integrally welded to an alloy steel threaded box ring of maximum outer diameter equal to that of the pipe end upset, said box ring including a portion having a radially extending abutment surface and an inner peripheral tapered threaded portion and a spacer portion therebetween and a neck at the end of the ring opposite from said abutment surface and adjacent said pipe end upset, said neck having at its end adjacent the pipe end upset an inner and outer diameter equal to that of the adjacent portion of said upset and a wall thickness roughly (±15%) equal to the wall thickness of the ring at the last thread scratch adjacent the spacer portion and equal to the wall thickness of the pipe end upset at the end thereof adjacent the neck, said pipe end upset including at one end a bell of uniform diameter equal to said maximum outer diameter disposed adjacent said ring and at the opposite end a transition piece tapering down from said maximum outer diameter adjacent the bell, said pipe end upset being hard surfaced at the juncture of said bell and transition piece and annular areas adjacent thereto, the hard surfaced area on said bell terminating short of the welded end of the bell a distance less than the axial length of the threaded portion of the box ring.

4. A tool joint pin comprising a pipe end bell of carbon steel integrally welded to an alloy steel threaded pin ring having a maximum outer diameter equal to that of the pipe end bell, said pin ring including a portion having a radially extending abutment surface and an outer peripheral tapered threaded portion and a spacer portion therebetween and a neck at the end of the ring opposite from said threaded portion and adjacent said pipe end bell, said neck and bell having equal uniform inner and outer diameters and wall thickness, said wall thickness being roughly (±15%) equal to the wall thickness of the ring at the last thread scratch of the pin root, the pipe end bell having an externally exposed outer peripheral maximum outer diameter tong engageable surface of a length at least equal to the length of the threaded portion of the ring.

5. A tool joint connection comprising engaged correlative externally and internally tapered threaded pin and box rings of alloy steel, each ring having a neck of uniform outer diameter equal to the maximum outer diameter of the ring and extending away from the engaged threaded portions of the rings, and a pipe end bell of carbon steel having a uniform outer diameter equal to that of said necks and integrally welded to each neck with a wall thickness at the weld equal to that of the neck, the length of said pipe end bell welded to said pin ring being at least equal to the length of the threaded portion of the box ring.

6. A drill pipe comprising a tubular body of uniform wall thickness and inner and outer diameter, an annular transition piece coaxially connected to each end of the body flaring and of increasing wall thickness progressing axially away from the body, the part of each transition piece adjacent said body having a wall thickness and inner and outer diameters equal to that of said body and the part of each transition piece remote from said body being thicker and of greater inner and outer diameter than said body, a bell conically connected to the part of each transition piece remote from said body, each bell having cylindrical external and internal surfaces equal in diameter to that of the thickest part of the adjacent transition piece, said bells having equal inner and outer diameters, said body, transition pieces and bells being formed of the same single piece of machinery grade carbon steel normalized throughout to a hardness of the order of 200 Brinell, i.e. between 160 and 240 Brinell except the juncture of the box end bell and transition piece and the annular portions adjacent to said juncture being exteriorly hard surfaced to have a hardness of at least 550 Brinell, said hard surface terminating short of the ends of said box end bell and transition piece remote from said juncture, a ring coaxially connected to the end of each bell remote from said body, said rings being made of alloy steel with a hradness of the order of 300 Brinell, i.e. between 250 and 350 Brinell, each ring including a tapered threaded portion, a radially extending abutting surface, an unthreaded portion therebetween, and a neck portion at the end thereof adjacent the bell having cylindrical inner and outer surfaces equal to that of the bell, one of said tapered threaded portions of said rings being an externally threaded pin and the other being a correlative internally threaded box, each of said threaded portions being adapted for connection with a correlative threaded portion on the ring on another congruent length of drill pipe, the wall thickness of the tapered threaded portion of the pin ring at the largest diameter thereof being roughly equal (±15%) to the wall thickness of the neck on the pin ring and the wall thickness of the tapered threaded portion of the box ring at the largest diameter thereof being roughly equal (±15%) to the wall thickness of the neck on the box ring, the box ring having an exteriorly exposed outer peripheral tong engageable cylindrical surface having an outer diameter equal to that of the box ring neck, the pin end bell having an exteriorly exposed outer peripheral tong engageable surface of an axial length at least equal to the axial length of said tong engageable surface of the box ring, said rings being connected to said bells by integral welding of the ring necks to the bells.

7. A drill pipe comprising a length of seamless pipe having bells forged at each end thereof and correlative pin and box alloy steel thread rings integrally welded to the wells, said bells and rings having equal maximum outer diameter, the pin end bell having a length at least equal to the length of the box ring, the box end bell having a carbide hard wear resisting surface and the pin end bell having a less than carbide hard tong-engageable surface.

8. Combination of claim 7 wherein the pipe is made of machinery grade carbon steel normalized throughout to a Brinell hardness less than 250.

9. Combination of claim 7 wherein the pipe is made of alloy steel drawn throughout to a Brinell hardness of between 160–240 except the said wear resisting surface of the box end bell being a heat hardened surface of between 650 and 700 Brinell hardness and the pin end bell having a Brinell hardness between 250 and 300 and equal to that of the box thread ring.

10. A tool joint pin comprising a steel pipe end bell integrally welded to a steel threaded pin ring having a greater hardenability than that of the pipe end bell and having a maximum outer diameter equal to that of the pipe end bell, the pipe end bell having an externally exposed outer peripheral maximum outer diameter tong engageable surface of a length at least equal to the length of the threaded portion of the ring and said bell and ring having a wall thickness where welded together at least equal to the wall thickness of the pin root at the last thread scratch.

11. A tool joint box comprising a steel pipe end bell integrally welded to a steel threaded box ring of greater hardenability than the pipe end bell and of maximum outer diameter equal to that of the pipe end bell, said pipe end bell being hard surfaced over a portion of its length, the remaining portion of the bell not being hard-surfaced, the last said portion being at the end of the bell where it is welded to the box ring, the length of said last portion being less than the axial length of the threaded portion of the box ring, the minimum inner diameter of the box ring being at least as large as the crest diameter of the last thread at the end of the box opposite said box.

12. A tool joint connection comprising a pair of tool joint pin and box rings having engageable and disengageable correlatively externally and internally tapered threaded portions and unthreaded welding stub portions extending away from the threaded portions, a pair of pipe ends each having integrally welded to the stub portion of one of said rings an enlarged portion of a length at least as long as the threaded portion of the ring, said stub portions of said rings and said enlarged portions of said pipe ends having cylindrical outer surfaces of equal diameter which is the maximum diameter of the connected rings but the length of each of said stub portions being less than the length of the pipe end enlargement welded thereto whereby the pipe end enlarged portions which are long compared to said welding stub portions of the tool joint rings provide respectively on the pipe end enlarged portion welded to the pin ring a tonging surface comparable in length to that provided by the exterior of the threaded portion of the box ring and on the pipe and end enlarged portion connected to the box ring a wear surface long in comparison to the length of the weld influenced area represented by the weld stub portion of the ring.

13. The combination of claim 12 wherein said box ring includes a portion having a radially extending abutment surface and an inner peripheral tapered threaded portion and a spacer portion therebetween.

14. The combination of claim 13 wherein said pipe ends are made of carbon steel and said tool joint rings are made of an alloy steel of greater hardenability than said carbon steel, and said wear surface on the pipe end that is welded to the tool joint box ring is hard surfaced.

15. The combination of claim 12 wherein said pin and box rings and pipe ends are made of steel and the ring steel has a greater hardenability than the pipe end steel.

16. The combination of claim 12 wherein said pipe ends are made of carbon steel and said rings are made of alloy steel.

17. The combination of claim 12 wherein said enlarged portion of said pipe end that is welded to said box ring is hard surfaced from a point nearer the weld area between said end and box ring than the axial length of the threaded portion of the box ring to a point farther from said weld area.

References Cited in the file of this patent

UNITED STATES PATENTS

| | | |
|---|---|---|
| 1,993,269 | Fletcher | Mar. 5, 1935 |
| 2,239,826 | Neuhaus | Apr. 29, 1941 |
| 2,258,066 | Oyen | Oct. 7, 1941 |
| 2,301,495 | Abegg | Nov. 10, 1942 |
| 2,334,350 | Neuhaus | Nov. 16, 1943 |

FOREIGN PATENTS

| | | |
|---|---|---|
| 865,883 | Germany | Feb. 5, 1953 |